United States Patent [19]

Wu

[11] Patent Number: 5,801,767
[45] Date of Patent: Sep. 1, 1998

[54] IMAGE SCREEN AUTOMATIC ADJUSTMENT APPARATUS FOR VIDEO MONITOR

[75] Inventor: Trans Wu, Taipei Hsien, China

[73] Assignee: Amtran Technology Co., Ltd., Taipei, Taiwan

[21] Appl. No.: 661,927

[22] Filed: Jun. 11, 1996

[51] Int. Cl.$^6$ .............................. H04N 3/22; H04N 17/00
[52] U.S. Cl. ............................ 348/190; 348/511; 345/11
[58] Field of Search .................................... 348/180, 189, 348/190, 511, 556, 581, 704, 805, 806, 807, 558, 443, 476, 184; 345/10, 11, 12, 127; H04N 3/227, 5/04, 3/22, 17/00

[56] References Cited

U.S. PATENT DOCUMENTS

| | | | |
|---|---|---|---|
| 5,241,281 | 8/1993 | Wilkes et al. | 348/558 |
| 5,257,350 | 10/1993 | Howard et al. | 395/501 |
| 5,550,556 | 8/1996 | Wu et al. | 348/476 |
| 5,572,259 | 11/1996 | Nohara | 348/511 |

*Primary Examiner*—John K. Peng
*Assistant Examiner*—Jeffrey S. Murrell
*Attorney, Agent, or Firm*—Baker & McKenzie

[57] ABSTRACT

An image screen automatic adjustment apparatus for a video display monitor device is provided. The apparatus includes a microprocessor for handling the operation of the monitor device and for implementing the image screen adjustments. The monitor device has a switch for enabling the image screen automatic adjustment. Push button processor circuitry is coupled between the switch and the microprocessor for signalling to the microprocessor when the switch is enabled. Image inspection circuitry is coupled to the microprocessor for outputting horizontal and vertical image signals and horizontal front-back porch signals. When the image screen automatic adjustment switch is enabled, the image inspection circuitry provides the horizontal and vertical image signals and the horizontal front-back porch signals to the microprocessor for implementing an optimization analysis processing to obtain a set of optimized control parameters including a vertical size parameter $V_{size}$, a vertical position parameter $V_{position}$, a horizontal size parameter $H_{size}$, and a horizontal position parameter $H_{position}$. The microprocessor automatically adjusts the image screen based on this set of optimized control parameter.

6 Claims, 6 Drawing Sheets

IMAGE SCREEN AUTOMATIC ADJUSTMENT APPARATUS FOR VIDEO MONITOR

BACKGROUND OF THE INVENTION

1. Field of the Invention

The present invention relates in general to a control apparatus for video monitors, and in particular, to an image screen automatic adjustment apparatus for video monitors. More particularly, the present invention relates to an image screen automatic adjustment apparatus for microprocessor-controlled video monitors that implements better control over factors such as position and size of the displayed image screen.

2. Technical Background

Video monitors of earlier designs process analog video signal and utilize a number of analog-style control knobs (which are normally variable resistors coupled thereto) for display monitor control functions such as horizontal and vertical shifts, vertical magnification, contrast and brightness, etc. Such control knob arrangement for monitor display adjustment, although considered basically suitable for those monochrome, single-frequency black-and-white video monitors, is somewhat confusing for users of modern multiple-frequency color display monitors. In other words, this analog-style control knob arrangement is only allowed for use under predetermined and limited number of timing modes. For different monitor design specifications and different display adapter boards, circuit design changes and modifications to printed circuit board layout may have to be implemented, which constitutes great problem and causes trouble for both monitor designer and manufacturer.

In order to solve the above-described problem, control circuitry for display monitors have gradually moved into the arena of digital control. Microprocessors are used in these digital control circuitries to implement image screen display control. With microprocessor display control logic, different display monitor designs can be implemented utilizing the same digital controller logic, with the only requirement that the firmware and data base for the particular microprocessor be modified accordingly. No controller logic hardware circuitry design would have to be altered. This has provided great flexibility and convenience for both designer and manufacturer of video display monitors. Within the hardware configuration of the digital controller for display monitors, push buttons are normally provided on the control panel for user's access to facilitate the display adjustment. One practice for implementing the video display monitor control has been employing the push buttons identified by plus ("+") and minus ("–") symbols respectively for each of the controlled functions including horizontal and vertical shifting, vertical magnification, contrast, and brightness of the displayed screen. Another practice, on the other hand, has been utilizing a pair of arrow-headed buttons identified by right-("→") and left-pointing ("←") arrow symbols for the user of a video display monitor to select one from a menu of functions to be adjusted, and then utilizing another pair of buttons having identified by the plus and minus symbols respectively to facilitate the adjustment.

The addition to these push-button means for implementing image screen control for video display monitors, ease and convenience of microprocessors to practically implement image control have recently been utilized to facilitate automatic adjustment control of image screen for multiple-frequency video display monitors. They involve a scheme known as "recalling" for the automatic control of both the position and size of the displayed image screen. Image signal timing information as well as their corresponding controlling parameters for various commercially available video display monitors are collected in advance and stored in memory of the microprocessor-based logic for later controlling purposes. With the depress of the push buttons for the desired control function, features such as the adjustment of position and/or size of the displayed image screen can be achieved.

However, this scheme is only applicable to video display monitors with known signal timing information as well as the correspondingly-developed controlling parameters. For those video display monitor devices having signal timing information thereof unknown, this data recalling scheme would not allow the system to facilitate effective control, sometimes even results in total lost of control over the image display screen. In this case, a user will have to restore to satisfactory image screen display status of the video monitor device through manually performing all the adjustments over each and every push buttons or knobs.

Thus, obviously, video display monitor devices featuring such recalling scheme are easy to have a user caught up in the troublesome procedure of restoration of displayed image screen characteristics. This is due to their inherent deficiencies in adopting to those of many video monitors which do not have their characteristics information included in their database. This is particularly true for new monitor devices that come into being after the control logic of the monitor device employing the recalling scheme is manufactured. With the basic understanding in mind that video display monitors are used for the display of image screens for a user, it is therefore of utmost importance that the image screen be adjusted to the ideal status of proper position and size. There is therefore a strong demand in this are for an automatic adjustment apparatus for video display control featuring better capability to adopt to, as well as stability and reliability, in control over the vast majority of display monitors commercially available.

SUMMARY OF THE INVENTION

It is therefore an object of the present invention to provide and image screen automatic adjustment apparatus for video display monitors that implements an analysis an computational procedure to optimize a set of image screen control parameters based on the detected vertical and horizontal image signals, vertical and horizontal synchronization signals, and the vertical and horizontal front and back porch signals.

It is another object of the present invention to provide and image screen adjustment apparatus for video display monitors that employs a low-cost and simple hardware architecture implementing a simple and small software routine to optimize a set of image screen control parameters based on the detected vertical and horizontal front and back porch signals.

The present invention achieves the above-identified objects by providing and image screen adjustment apparatus for video display monitors the comprises a microprocessor for handling the operation of monitor device and for implementing image screen adjustments. An image screen automatic adjustment enable switch is provided on the monitor device. A push button processor circuitry is coupled between the image screen automatic adjustment enable switch and the microprocessor, and push button processor circuitry signifies to the microprocessor when the switch is enabled. An image inspection circuitry is coupled to the microprocessor for detecting the horizontal and vertical image signals and the horizontal and vertical front-back porch signals. When the image screen automatic adjustment enable switch is enabled, the image inspection circuitry provides the detected horizontal and vertical image signal and the horizontal and vertical front-back porch signals to the microprocessor means for implementing an optimization analysis processing to obtain a set of optimized control parameters that includes a vertical size parameter $V_{size}$, a vertical position parameter $V_{position}$, a horizontal size parameter $H_{size}$, and a horizontal position parameter $H_{position}$. The microprocessor then automatically adjusts the image screen based on the optimized parameters.

BRIEF DESCRIPTION OF THE DRAWING

Other objects, features, and advantages of the present invention will become more apparent by way of the following detailed description of the preferred but non-limiting embodiments. The description is made with reference to the accompanying drawings in which.

DETAILED DESCRIPTION OF THE PREFERRED EMBODIMENT

Figure 1:
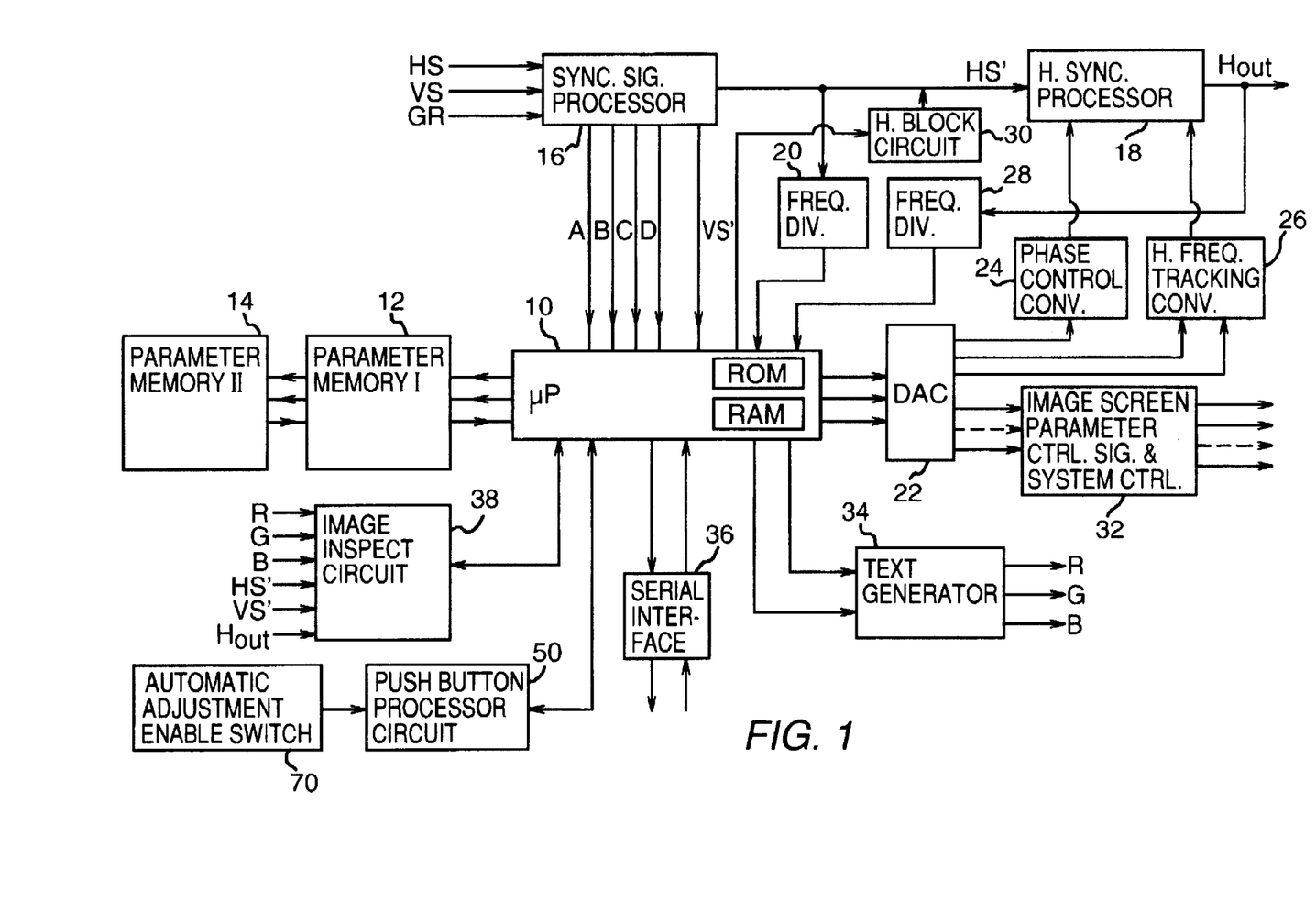
FIG. 1 shows a block diagram of the digital image screen automatic adjustment apparatus for video monitor devices in accordance with a preferred embodiment of the present invention.

Refer to FIG. 1 of the drawing. FIG. 1 shows a block diagram of the digital image screen automatic adjustment apparatus for video monitor devices in accordance with a preferred embodiment of the present invention. In this depicted embodiment, a microprocessor 10 is utilized to execute a controlling scheme embedded in the firmware that implements the image screen adjustment functions for the video display monitor. The microprocessor 10 may be considered as the central processing unit (CPU) or the microprocessor 10 may apparatus, depending on either it is a microprocessor or a microcontroller in nature. In this described example, a microprocessor is used. Microprocessor 10 includes its on-chip read-only memory (ROM) and random-access memory (RAM) for holding firmware program and operation-related date respectively. Essentially, the RAM is used to store the apparatus parameters and for storage of intermediate date necessary for its operation. The control apparatus of FIG. 1 also includes a first parameter memory 12 and a second parameter memory 14, which can be electrically erasable-programmable read-only memory (EEPROM) or any other similar memory device.

The first parameter memory 12 is utilized for the storage of important apparatus parameters and those user-specific parameters. The control scheme embedded in the firmware of the apparatus of FIG. 1 is designed to detect whether or not there is any parameter date held in the first parameter memory 12 after the very first time the power is applied to the apparatus for testing. If there was parameter date present in the first parameter memory 12, apparatus parameters will then be downloaded in memory 12. All parameter changed as a result of user adjustment to the apparatus will also be held in memory 12. Later apparatus operations will be based on these parameters held in the first parameter memory 12. The second parameter memory 14 is used for the storage of information needed by an on-screen display data frame, which will be described in detail in the following paragraphs. Because of the use of the first and second parameter memories 12 and 14, different requirements of the video display monitors from different customers may be fulfilled by changing different versions of the parameter memories 12 and 14 without having to alter the microprocessor hardware, as is required in the prior are cases. Monitor manufacturing may therefore be conducted in a manner with reduced costs and less schedule delay, together with increased flexibility, convenience and competitiveness.

A synchronization signal processor 16 is coupled with the microprocessor 10. It receives an external source (a display of a host system, for example) of horizontal synchronization signal HS, vertical synchronization signal VS, and image signal GR and performs processing thereon to provide horizontal polarity signal A, vertical polarity signal B, horizontal signal C and vertical signal D, as well as vertical synchronization frequency signal VS' for the microprocessor 10. Meanwhile, the synchronization signal processor 16 also provides a horizontal synchronization frequency signal HS' to a horizontal synchronization processor 18 also connected thereto. Horizontal and vertical polarity signals A and B may each represent positive and negative polarities respectively, while horizontal and vertical signals C and D may each represent the presence or non-presence of the signals respectively. Combination of these four signals, with the addition of the detection capability to the vertical and horizontal frequencies provided by the microprocessor 10, allows to construct a video display monitor control and adjustment apparatus equipped with features of more flexibility. This means a more versatile functionality that can be driven by the various types of external signal source, the display adapter of the host system, in other words. In the apparatus of FIG. 1, the horizontal synchronization frequency signal HS' provided by the synchronization signal processor 16 to the horizontal synchronization processor 18, may also be sent to the microprocessor 10 via a frequency divider 20. This arrangement is based on the fact that horizontal synchronization signals typically have very high frequency that the microprocessor 10 can not handle directly. After frequency reduction in the frequency divider 20, the microprocessor 10 can detect the frequency the signal carries.

Horizontal synchronization processor 18 receives the horizontal synchronization frequency signal HS' from the synchronization signal processor 16, and releases a horizontal shift output signal $H_{out}$ under control of the microprocessor 10. Microprocessor 10 relies primarily on a digital-to-analog converter (DAC) 22, a phase control converter 24, and a horizontal frequency tracking converter 26 to control the horizontal synchronization processor 18 in its output of the precision horizontal shift output signal $H_{out}$. Due to the fact that the electronic circuit characteristics of each of a number of manufactured controller logic circuitry, although all of the same model, would have slight discrepancies between each other, each of the controller logic circuit boards will require testing and factory adjustments in its phase control converter 24 as well as in horizontal frequency tracking converter 26. This allows for precision synchronization among the horizontal synchronization signal HS and the horizontal output signal generated by the horizontal synchronization processor 18.

A simple and convenient approach is adopted by the image screen adjustment apparatus for video monitor in accordance with the preferred embodiment of the present invention. Essentially, the horizontal shift output signal $H_{out}$ of the horizontal synchronization processor 18 would be processed by a frequency divider 28 before it is fetched to the microprocessor 10, in order to allow for the microprocessor 10 to detect the frequency of the horizontal shift output signal $H_{out}$. Further, the control scheme embedded in the firmware of the apparatus of FIG. 1 is designed to have the microprocessor 10 implement its calculation, tracking and adjustment based on the feedback horizontal output signal in order to obtain the optimized control parameters that achieve in the most precision horizontal output signal frequency after the first time power is supplied to the apparatus for testing. Those obtained parameters are then written into its own memory locations, as well as in the first parameter memory 12 for later control implementation purposes. During the process the microprocessor 10 is performing this adjustment, a horizontal clocking circuitry 30 is utilized to cut off the horizontal synchronization frequency signal HS', so that it will no longer be input to the horizontal synchronization processor 18. In this manner, manual adjustments may be reduced to a minimum, resulting in the overall reduction in manufacturing time and costs.

The automatic adjustment apparatus of the present invention also comprised an image screen parameter control signal and apparatus controller 32. This controller 32 is indirectly controlled by the microprocessor 10 via the DAC 22 to output image screen parameter control signals and the control signals for the apparatus. Also, a text image generator 34 is included in the apparatus of FIG. 1 which is coupled to and controlled by the microprocessor 10 to generate text image signals.

The automatic adjustment apparatus is seen in the drawing to further comprise a serial interface circuitry 36 coupled to the microprocessor 10. The serial interface circuitry 36 may, for example, comprise an RS-232 serial interface. This allows for the user of the apparatus to transfer data from the host to the video monitor to implement display image control or to modify the control parameters.

An image inspection circuitry 38 is also included in the apparatus of FIG. 1 which is directly coupled to the microprocessor 10 for the inspection and gathering of the status information of the displayed video image. Information including, such as, the constituent R, G, and B component signals of the video image, the horizontal and vertical synchronization frequency signals HS' and VS' respectively, as well as the horizontal shift output signal $H_{out}$, are gathered and processed. Results such as horizontal and vertical image signals and the horizontal and vertical front and back porch signals obtained by processing upon these information as collected by the image inspection circuitry 38 is then provided to the microprocessor 10. Based on these collected image signal information, the microprocessor 10 is allowed to conduct the necessary analysis to figure out image screen parameters including the vertical size $V_{size}$, the vertical position $V_{position}$, the horizontal size $H_{size}$, and the horizontal position $H_{position}$. With these image screen status parameters at hand, the microprocessor 10 therefore is able to implement its automatic adjustment of the image screen display characteristics concerning factors such as the central positioning and the proper sizing, both vertical and horizontal, of the image displayed in the screen.

Frequency of the horizontal and vertical synchronization signals, front and back porches and the horizontal and vertical image signals together determine the size and position of the displayed image on the screen. Frequency of the horizontal image signal is considered quite high, in the range of 25 to 150 MHz, and the widths of the front and back porches quite small, in the range of several microseconds, to be directly processed by the microprocessor 10 itself. Circuitry means specifically designed are therefore included in the apparatus of the present invention to measure these signals for the microprocessor 10. On the other hand, frequency of the vertical image signals normally in the range of less than 100 Hz and widths of the corresponding front and back porches are in the quite comfortable range of several hundred microseconds, they are therefore only simply processed before sent to the microprocessor 10 for measurement. A preferred embodiment of such an image inspection circuitry 38 is exemplified in FIG. 2 for outlining the operation thereof.

Figure 2:
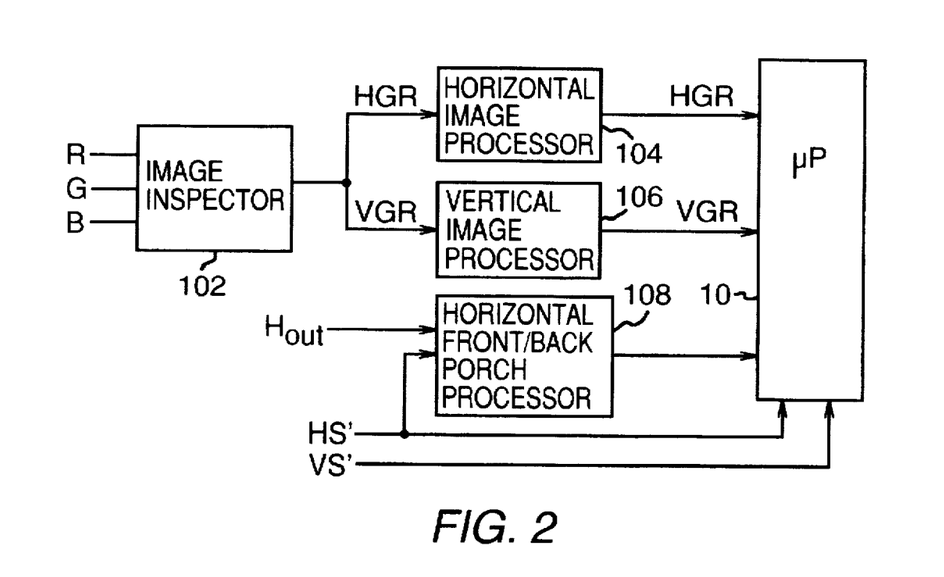
FIG. 2 schematically shows the block diagram of the image inspection circuitry utilized in the automatic adjustment apparatus of FIG. 1.
Figure 3:
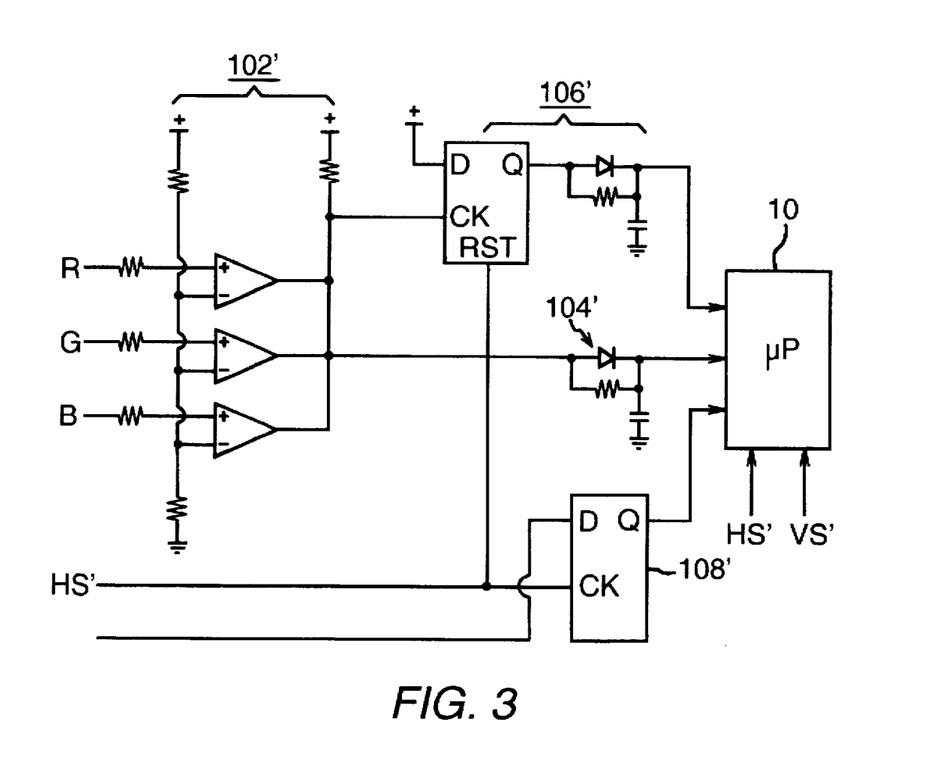
FIG. 3 is a schematic diagram showing an embodiment of the image inspection circuitry of FIG. 2.

Refer to FIG. 2 of the drawing. The schematic block diagram of the image inspection circuitry 38 is shown to comprise an image inspector means 102, a horizontal image processing circuitry 104, a vertical image processing circuitry 106, and a horizontal front-back porch processing circuitry 108. The microprocessor 10 is also included in the drawing to show the inter-relationship therewith. As is seen in the drawing, the image inspector means 102, which is further detailed in the form of substantial electronic circuitry in the schematic diagram of FIG. 3, receives the R, G and B components of the image signal and implements detection thereof. In FIG. 3, it can be seen that a height-speed comparator array 102' comprising three independent comparators can be utilized to substantially implement the function of the image inspector means 102 of FIG. 2. Each of the three comparators is responsible to processing one of the R, G and B image component signals sent thereto.

on the other hand, the horizontal image processing circuitry 104 is seen in the drawing to receive the output of the image inspector means 102 and fetches its processed result to microprocessor 10. Essentially, the horizontal image processing circuitry 104 receives the horizontal image signal HGR sent by the image inspector means 102 and assembles the discontinuous sections into a continuous signal and then output to the microprocessor 10. This allows the microprocessor 10 to be able to figure out the time period of the horizontal image signal HGR. A substantial electronic circuitry embodiment of the horizontal image processing circuitry 104 can again be found in FIG. 3, where it is seen implemented as an integration circuit 104' comprising a simple network of a diode, a resistor and a capacitor.

Next, in a similar manner, the vertical image processing circuitry 106 can be seen in the drawing to receive the output of the image inspector means 102 and fetches its processed result to microprocessor 10. The vertical image processing circuitry 106 received the vertical image signal VGR sent by the image inspector means 102 and assembles the discontinuous sections into a continuous signal and then output to the microprocessor 10. This allows the microprocessor 10 to figure out the time period of the vertical image signal VGR. A substantial electronic circuitry embodiment of the vertical image processing circuitry 106 can again be found in FIG. 3, where it is seen implemented as an integration circuit similar to 104' for the horizontal image processing circuitry 104 cascaded behind a D-type flip-flop, as generally indicated by reference numeral 106'. As mentioned above, since the widths of the vertical front-back porch signals are in the more or less comfortable range of several hundred microseconds for processing by the microprocessor 10 of the inventive apparatus, they can therefore be easily obtained via processing by the microprocessor 10. Essentially, the microprocessor 10 can figure out the widths of the vertical front and back porch signals simply consulting to its obtained vertical synchronization frequency signal VS' and the vertical image time obtained in the vertical image processing circuitry 106' of FIG. 3.

Then, the horizontal front-back porch processing circuitry 108 that comprise a constituent part of the image inspection circuitry 38 is seen in the drawing to be receiving the horizontal synchronization frequency signal HS' and the horizontal shift output signal $H_{out}$ of the horizontal synchronization processor 18 (FIG. 1). Based on these two input signals, the horizontal front-back porch processing circuitry 108 can determine the horizontal front and back porch signals for output to the microprocessor 10. In FIG. 3, the horizontal front-back porch processing circuitry 108 is implemented as s simple D-type flip-flop 108'.

Thus, as described above, with all the gathered and/or processed signals as sent by the image inspection circuitry 38, the microprocessor 10 is able to figure out the best possible image screen display characteristics in the form of optimized image centering as well as horizontal and vertical sizing. Essentially, the microprocessor 10 can conduct an analysis utilizing the horizontal and vertical image signals, the horizontal and vertical front-back porch signals received from the image inspection circuitry 38, as well as the horizontal and vertical synchronization frequency signals from other circuities in the inventive apparatus. The result of the analysis can be translated into a set of parameters that can be used to automatically implement the adjustment control for the display screen. Specifically, the set of parameters would include the vertical size parameter $V_{size}$, the vertical position parameter $V_{position}$, the horizontal size parameter $H_{size}$, and the horizontal position parameter $H_{position}$.

Figure 4A:
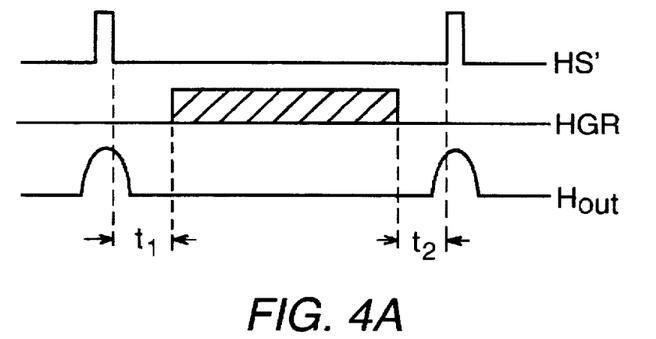
FIG. 4A is a time diagram showing the inter-relationship between horizontal synchronization frequency signal, horizontal image signal and horizontal shift output signal for defining the horizontal front and back porch signals of the display image.

FIG. 4A is a time diagram showing the inter-relationship between the horizontal synchronization frequency signal HS', the horizontal image signal HGR, and the horizontal shift output signal $H_{out}$ as extracted from the corresponding circuit nodes in the embodiment of the inventive apparatus of FIG. 1. In the horizontal image signal HGR, the portion of the time period signified by the shaded pulse represents the image display signal region in the display signal cycle. The time interval identified by $t_2$ essentially the time period between the leading edge of the shaded image display signal region of the horizontal image signal HGR and the trailing edge of the first positive pulse of the horizontal synchronization frequency signal HS' just preceding thereto, is the horizontal back porch for the image signal cycle. On the other hand, the time interval identified by the $t_2$, the time period between the trailing edge of the shaded image display signal region of the horizontal image signal HGR and the leading edge of the second positive pulse of the horizontal synchronization frequency signal HS' just trailing therebehind is the horizontal front porch for the image signal cycle.

Figure 4B:
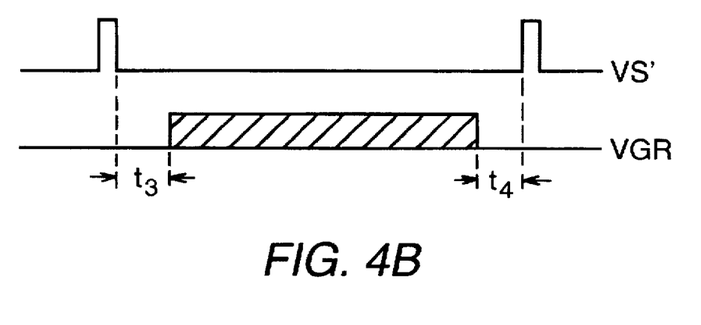

FIG. 4B is a time diagram showing the inter-relationship between vertical synchronization frequency signal VS' and vertical image signal VGR as extracted from the corresponding circuit nodes in the embodiment of the inventive apparatus of FIG. 1. In the horizontal image signal VGR, the portion of the time period signified by the shaded pulse represents the image display signal region in the display signal cycle. The time interval identified by $t_3$, essentially the time period between the leading edge of the shaded image display signal region of the vertical image signal VGR and the trailing edge of the first positive pulse of the vertical synchronization frequency signal VS' just preceding thereto, is the vertical back porch for the image signal cycle. On the other hand, the time interval identified by $t_4$, the time period between the trailing edge of the shaded image display signal region of the vertical image signal VGR and the leading edge of the second positive pulse of the vertical synchronization frequency signal VS' just trailing therebehind is the vertical front porch for the image signal cycle.

Due to the fact that the horizontal front and back porches have very short time periods that the microprocessor 10 can not process directly, the horizontal front-back porch processing circuitry 108 can instead determine the horizontal front and back porch signals for the microprocessor 10. As seen in FIG. 3, the horizontal front-back porch processing circuitry 108 of the image inspection circuitry 38 is implemented as a simple D-type flip-flop 108'. The D-input of the flip-flop 108' is connected to receive the horizontal shift output $H_{out}$ of the horizontal synchronization processor 18. The clock input of the flip-flop 108' is driven by the horizontal synchronization frequency signal HS'. The Q output of the flip-flop 108' is then sent to the microprocessor 10.

With simultaneous reference to FIG. 3 and 4A, it can be seen that the control system design for conventional video image display monitors requires that the horizontal synchronization pulse fall within the pair of two consecutive pulses of horizontal shift output signal, wherein the time period between this pair of consecutive pulses of horizontal shift output signal define the time period when images are visible on the display screen. Thus, with the use of the D-type flip-flop 108', the occurrence of the horizontal shift pulse can be detected and the microprocessor 10 advices of such occurrence. Based on this information, together with the analysis on the determined horizontal frequency, proper horizontal size $H_{size}$ and position $H_{position}$ parameters can be determined so as to position the display image so that it falls over the proper location within the time range confined by two horizontal shift pulses. In other words, this allows to ensure that the entire display image would be positioned in the visible area of the screen.

Figure 5:
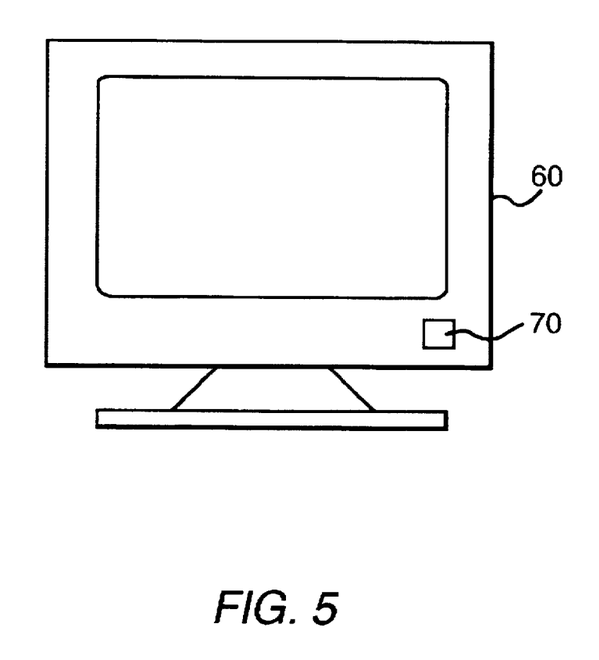
FIG. 5 schematically shows the front view of a video display monitor employing the image screen automatic adjustment apparatus of the present invention.

In FIG. 5 is schematically shown the front view of a video display monitor employing the image screen automatic adjustment apparatus of the present invention. An automatic picturing function button 70 is arranged in the control panel of the video monitor 60 to provide the "auto-picture" functionality implemented utilizing the inventive automatic adjustment apparatus. The automatic picturing function button 70 is coupled to the microprocessor 10 via the push button processor circuitry 50 (observing FIG. 1). Whenever the on-off status of the function button 70 relayed to the microprocessor 10 by the push button processor circuitry 50 is determined to signify a user's requirement of enabling the automatic adjustment, the microprocessor 10 will conduct an analysis procedure to determine an optimized set of control parameters so that the displayed screen can reflect a properly center-positioned and sized image. As described above, this set of optimized display control parameters will include at least the vertical size $V_{size}$ and position $V_{position}$ and the horizontal size $H_{size}$ and position $H_{position}$ parameters.

The key to the implementation of automatic adjustment for the display image screen of video monitor in accordance with the disclosure of the present invention is this the image inspection circuitry 38. One of the substantial embodiments, the one depicted in the schematic diagram of FIG. 3 for the block diagram outlined in FIG. 2 for this image inspection circuitry 38, is a very low-cost implementation of the present invention. In addition to the cost-effectiveness of such implementation is the improved functionality when compared to the prior art. The underlying concept of the apparatus of the present invention is also suitable for the latest image signal timing sequences. Further, as full-screen computer windowing operating environments become ever more popular, the present inventive automatic adjustment apparatus for video monitor image screen would be even more suitable and reliable.

Although the low-cost embodiment of FIG. 3 for the image inspection circuitry of the present inventive apparatus has not actually measured the horizontal front and back porch time periods but rather skillfully detected the presence of surging horizontal shift output pulses, however, its usefulness has already been verified in experiments. In order to achieve even better performance of the automatic adjustment apparatus of the present invention, another circuitry embodiment that actually measures the horizontal front and back porch time periods is described below. As persons skilled in the art may well appreciate, such image inspection circuitry is better suitable for high-end multiple frequency color monitors.

Figure 6:
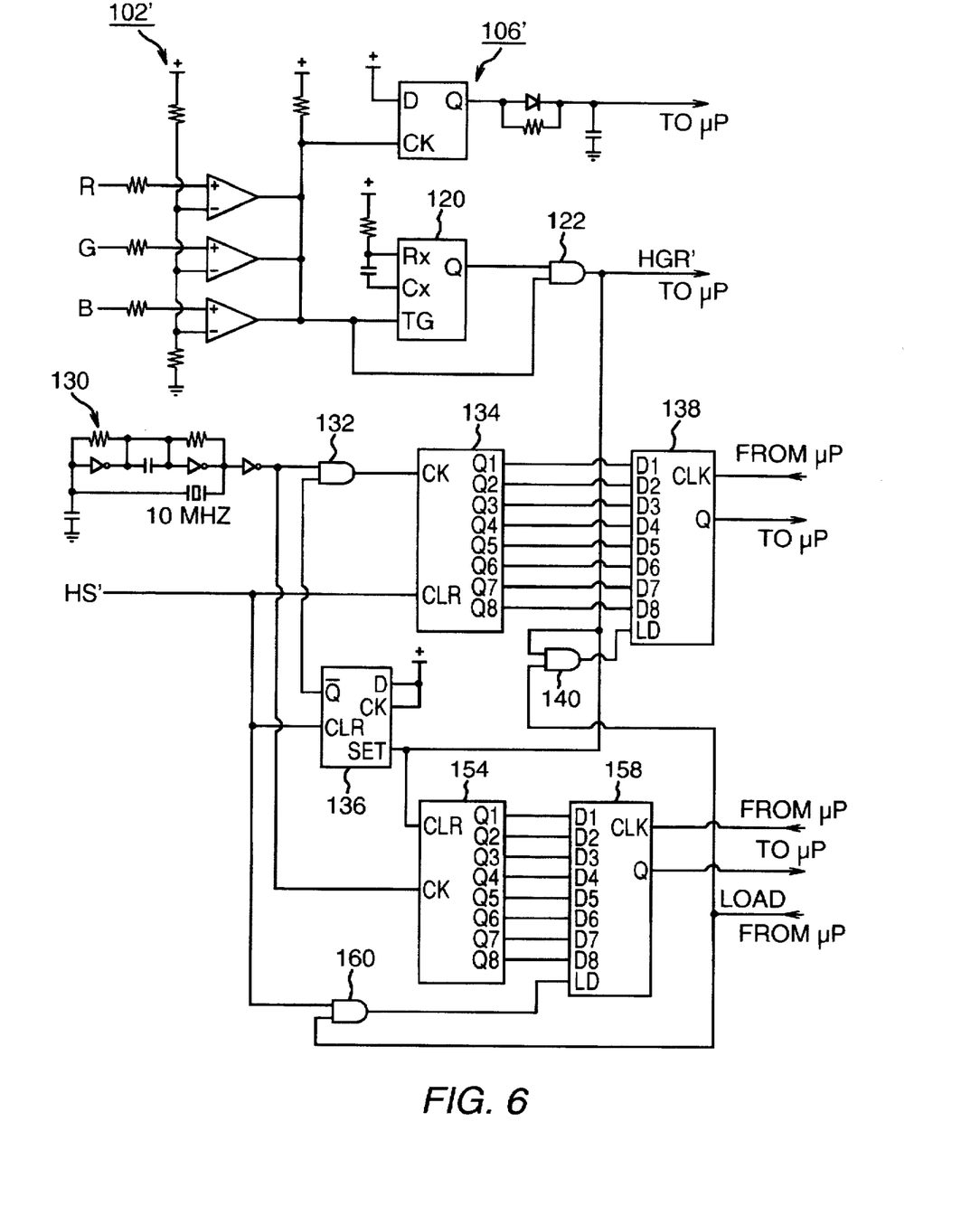
FIG. 6 is a schematic diagram showing another embodiments of the image inspection circuitry of FIG. 2.

FIG. 6 show the schematic diagram of another embodiment of the image inspection circuitry 38 in addition to the basic implementation depicted in FIG. 3. As is seen in the drawing, the image inspector means 102' and the vertical image processing circuitry 106' are basically similar to their counterpart in FIG. 3. However, the horizontal image processing circuitry, represented by reference numeral 104 in the block diagram 2, is now constructed employing a re-triggerable one-shot means 120 and an AND gate means 122. This combination of the re-triggerable on-shot means 120 and the AND gate means 122 is utilized to combine the discontinuous image signal sections into a continuous signal for measurement. The combined logic of the re-triggerable one-shot 120 and the AND gate means 122 generates a version of the horizontal image signal HGR', which, when processed by the circuitry in addition to the image inspector means 102', the image processing circuitry 106', the re-triggerable one-shot 120 and the AND gate means 122 as outlined in the drawing can be utilized to determine the actual time periods for horizontal front and back porch signals. The following paragraphs describe the image inspection circuitry of FIG. 6.

In the image inspection circuitry of FIG. 6, a clock generator 130 is provided to generate a timing reference clock signal for the circuitry. The embodiment employs a clock frequency of 10 MHz. Clock output of the clock generator 130 is sent to one input of a two-input AND gate means 132. The other of the input of the AND gate means 132 is supplied by the inverse Q output of a D-type flip-flop 136. Output of the AND gate means 132 is sent to the clock input of an 8-bit counter 134. Horizontal synchronization frequency signal HS' is tied to the clear inputs of both the 8-bit counter 134 and another D-type flip-flop 136. An effective input of the HS' pulse will this clear the content of the counter 134 as well as setting up the D-type flip-flop 136 to a present status wherein the inverse Q output is preset to a logical one. The 8-bit counter 134 can then initiate its counting. As the horizontal image signal HGR' output by the AND gate means 122 becomes a logical one and input to the SET input of the D-type flip-flop 136, the 8-bit counter 134 will cease its counting operation as its clock input will be nullified by the logical zero output of inverse Q output of the D-type flip-flop 136. In this manner, the count maintained in the 8-bit counter 134 when it stops counting represents a measure of the time period between the occurrences of the horizontal synchronization pulse and the horizontal image signal. This time period is the very time period of the horizontal back porch signal.

Still in FIG. 6, each of the 8 output bits of the 8-bit counter 134 is coupled to the corresponding one of the 8 inputs of a parallel-to-serial output register 138. The 8-input parallel-to-serial output register 138 is this capable of properly converting the countered output of the counter 134 into serial format for output to the microprocessor 10 not shown in the drawing of FIG. 6. Whenever a user request for the automatic picturing functionality, the microprocessor 10 will issue an active high load control signal LOAD and relay to one input of a two-input AND gate means 140. The other of the AND gate means 140 is fetched by the horizontal image signal HGR'. When the logical status of the HGR' signal turns logical one, an indication of the conclusion of the calculation of the time period of the horizontal back porch signal. Output of and AND gate means 140, when turns into a logical one, controls the 8-bit parallel-to-serial output register 138 to load the counted output of the 8-bit counter 134. The microprocessor 10 also issues its clock pulses to the clock input CLK of the 8-bit parallel-to-serial output register 138. At the clock pulses issued by the microprocessor 10, the microprocessor 10 is able to read the counter value in serial. Based on this counter value, the microprocessor may convert it into the actual time period of the horizontal back porch signal.

Further in FIG. 6, at the clock pulses of the clock generator 130, another 8-bit counter 154 is also allowed to conduct its counting. In a similar arrangement as that for the 8-bit parallel-to-serial output register 138, another 8-bit parallel-to-serial output register 158 is coupled to its corresponding counter 154. The horizontal image signal HGR' is tied to the clear input CLR of the counter 154. The horizontal image signal HGR' is tied to the clear input output of the counter 154. When the status of the signal HGR' turns logical one, the counted output of the counter 154 is cleared to zero. When the signal HGR' turns logical zero, the counter 154 may initiates its counting cycles. As a counterpart of the AND gate means 140, the AND gate means 160 has one of its two inputs tied to the horizontal synchronization frequency signal HS' and the other to the load control signal LOAD issued by the microprocessor 10. When the user of the monitor requests for the automatic picturing functionality, the microprocessor 10 will in turn issue the active-high signal LOAD. As the horizontal image signal HGR' concludes itself, the 8-bit counter initiates its counting until the occurrence of the next horizontal synchronization pulse. This is an indication of the conclusion of the calculation for the horizontal front porch signal. The AND gate means 160 then outputs a logical one to the load input LD of the 8-bit parallel-to-serial output register 158. This allows the register 158 to load the counter value from its coupled counter 154. In a manner similar to that for the counter 134 and register 138 pair, the microprocessor 10 also provides its clock pulses for the clock input of the 8-input parallel-input-serial output register 158. The counter value maintained in the register 158 may then be read by the microprocessor 10 and converted from the counter value into its corresponding time period of the horizontal front porch signal.

Figure 7:
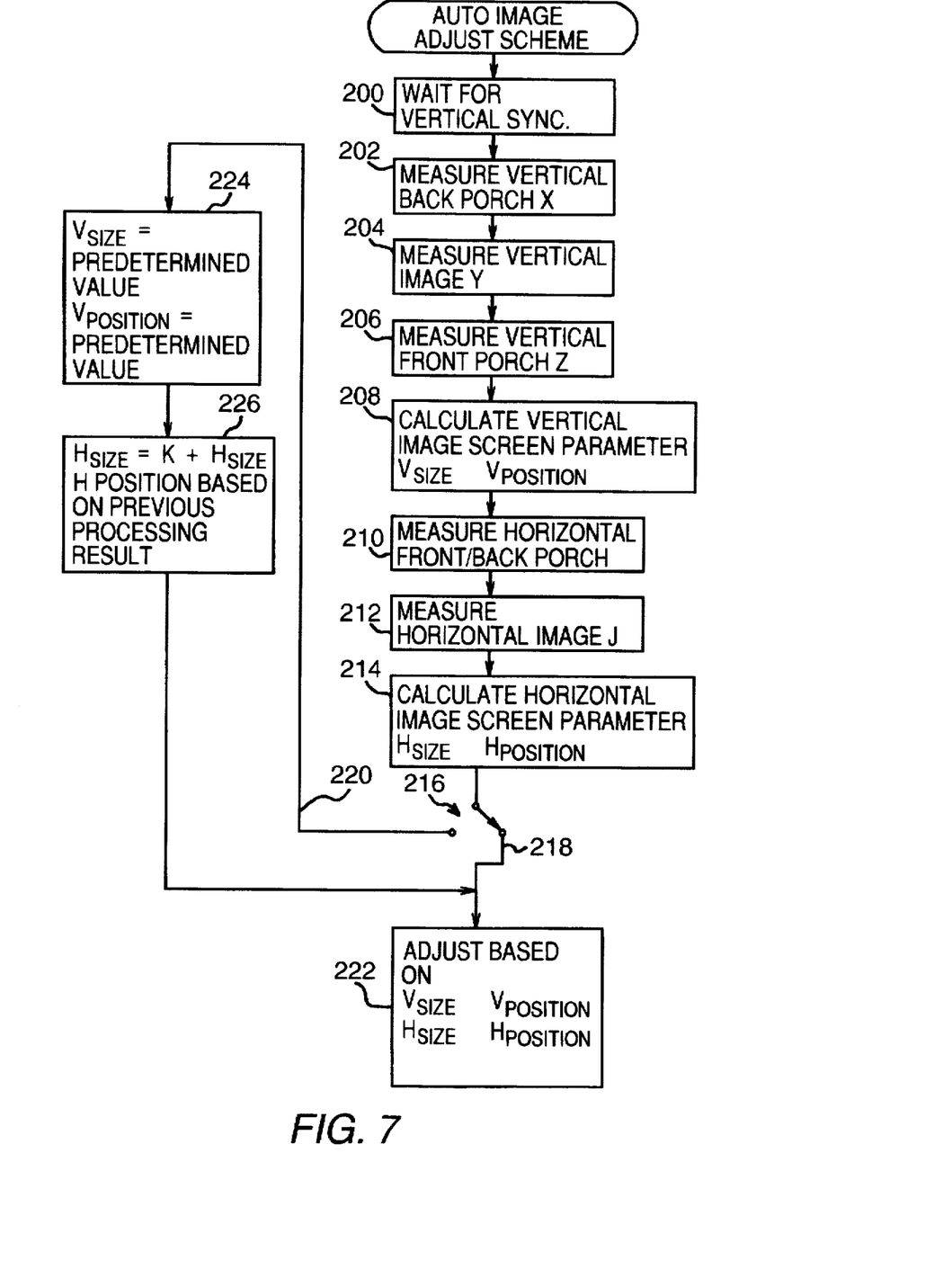
FIG. 7 is a flow chart showing the firmware control procedure of the image screen automatic adjustment apparatus in accordance with a preferred embodiments of the present invention.

Next, as is seen in FIG. 7, a flow chart show the firmware control procedure of the image screen automatic adjustment apparatus in accordance with a preferred embodiments of the present invention. After initialization of the firmware procedure, the scheme awaits the occurrence of the vertical synchronization signal at step 200. When the signal does arise, the microprocessor 10 may start its procedure of measurement of the time period X of the vertical back porch signal at step 202. This is followed by the measurement of the time period Y of the vertical image signal at step 204. Then the procedure continues with the measurement of the time period Z of the vertical front porch signal at step 206. Based on the obtained X, Y and Z values, the microprocessor 10 is able to implement it analysis scheme in a calculation procedure at step 20 8 to optimize the best set of vertical image control parameters including vertical size $V_{size}$ and vertical position $V_{position}$. Specifically, the optimization of the vertical parameters is based on the factors including the monitor electronic circuitry characteristics. In a preferred embodiment, the parameters $V_{size}$ and $V_{position}$ may be obtained in the following expressions:

$$V_{size}=Y+|K_1(|X+Z|)/2|$$

$$V_{position}=V_{pos}+|K_2(X-Z)|$$

wherein $V_{pos}$ is a predetermined constant obtained based on the monitor controller electronic circuitry characteristics. $K_1$ and $K_2$ are also predetermined constants respectively. Naturally, different equations are required to calculate the vertical size and position parameters $V_{size}$ and $V_{position}$ respectively for monitors having different electronic circuitry characteristics.

After the determination of the vertical parameters in step 208, horizontal front and back porch signal inspection circuitries are then employed in step 210 to measure the time periods I of the horizontal front and back porch signals. Meanwhile, the microprocessor 10 may measure the time period J of the horizontal image signal at step 212. Based on these obtained time period values, the microprocessor 10 may determine the optimized horizontal image parameters including horizontal size parameter $H_{size}$ and horizontal position parameter $H_{position}$ at step 214. Specifically, the optimization of the horizontal parameters is also based on the factors including the monitor electronic circuitry characteristics. In a preferred embodiment, the parameters $H_{size}$ and $H_{position}$ may be obtained in the following expressions:

$$H_{size}=J+K_3I$$

$$H_{position}=H_{pos}+K_4I$$

wherein $H_{pos}$ is predetermined constant obtained based on the monitor controller electronic circuitry characteristics. $K_3$ and $K_4$ are also predetermined constants respectively.

Whenever the user of the inventive monitor device pressed the "auto-picture" function button on the control panel of the monitor to enable the automatic adjustment functionality, the firmware routine is designed to be alternatively following the route identified by reference numerals 218 and 220. A two-to-one selection switch means 216 is employed in the drawing to signify this program branching characteristics of execution. The selection of the program execution among the two routes 218 and 220 is on an alteration basis. In other words, when the user selects to allow the monitor control to facilitate its automatic adjustment of the image screen display characteristics, the firmware outlined in FIG. 7 would, for example, follow the route identified by 218 first and facilitate its automatic screen adjustment outlined in step 222. Essentially, the automatic adjustment of the image screen is facilitated by the microprocessor 10 based on at least the following parameters including vertical size $V_{size}$, vertical position $V_{position}$, horizontal size $H_{size}$ and horizontal position $H_{position}$.

After the control has concluded its first automatic adjustment, if the use is not satisfied with the resulted screen display, it is not necessary to resort to tedious manual adjustments. The user can still depress the function button to incur another automatic adjustment procedure by pressing on the function button again. At this moment, the procedure will alternatively take the route 220, and at step 224 the vertical size and position parameters $V_{size}$ and $V_{position}$ will be replaced by the default values. These default values were obtained based on different image signal timing sequences as well as the circuitry characteristics. They are pre-stored in memory means of the control circuitry. Then, at step 226, a predetermined constant K is added to the horizontal size parameter $H_{size}$ obtained in previous step 214. The constant K was determined based on different image signal characteristics and circuit characteristics of the control system and pre-stored in the memory means of the apparatus. Meanwhile, the horizontal position parameter Hposition may remain unchanged having a value determined by the time period of the horizontal front and back porch signals obtained in the previous program steps, or it may be slightly modified based on different image signal characteristics and circuit characteristics of the control system. The microprocessor 10 may then perform its automatic adjustment of screen image based on its optimized set of vertical and horizontal size and position parameters $V_{size}$, $V_{position}$, $H_{size}$ and $H_{position}$.

While the present invention has been described by way of example and in terms of preferred embodiments, it is to be understood that the invention need not be limited to the disclosed embodiments. It is intended to cover various modifications and similar arrangements included within the spirit and scope of the appended claims, the scope of which should be accorded the broadest interpretation so as to encompass all such modifications and similar structures.

I claim:

1. An image screen automatic adjustment apparatus for a video display monitor device comprising:

a microprocessor means for handling the operation of said monitor device and for implementing said image screen adjustment;

and image screen automatic adjustment enable switch means provided on said monitor device;

a push button processor circuitry coupled between said image screen automatic adjustment enable switch means and said microprocessor means, said push button processor circuitry signalling to said microprocessor means when said enable switch means is enabled; and and image inspection circuitry coupled to said microprocessor means, the image inspection circuitry for outputting horizontal and vertical image signals and horizontal front-back porch signals;

wherein when said image screen automatic adjustment enable switch means is enabled, said image inspection circuitry provides the horizontal and vertical image signals and said horizontal front-back porch signals to said microprocessor means for implementing an optimization analysis processing to obtain a set of optimized control parameters including a vertical size parameter $V_{size}$, a vertical position parameter $V_{position}$, a horizontal size parameter $H_{size}$, and a horizontal position parameter $H_{position}$, and said microprocessor means automatically adjusts said image screen based on said set of optimized control parameters.

2. The image screen automatic adjustment apparatus of claim 1, wherein said image inspection circuitry comprises:

an image inspector means for receiving R, G and B signals and for outputting said horizontal and vertical image signals;

a horizontal image processing circuitry coupled between said image inspector means and said microprocessor means for connecting the discontinuous sections of the horizontal image signal and for allowing said microprocessor means to measure the time period of said horizontal image signal;

a vertical image processing circuitry coupled between said image inspector means and said microprocessor means for connecting the discontinuous sections of the vertical image signal and for allowing said microprocessor means to measure the time period of said vertical image signal; wherein said microprocessor means receives a vertical synchronization signal for determining the time period of vertical front-back porch signals based on the timing of said vertical image signal; and a horizontal front-back porch signal processing circuitry coupled to said microprocessor means for receiving a horizontal synchronization signal and a horizontal shift output signal for detecting the occurrence of a horizontal synchronization pulse and a horizontal shift output pulse, wherein said detect occurrence is relayed to said microprocessor means for processing to obtain the horizontal image parameters.

3. The image screen automatic adjustment apparatus of claim 2, wherein said horizontal front-back porch processing circuitry comprises a D-type flip-flop having the D input thereof connected to said horizontal shift output signal, the clock input thereof connected to said horizontal synchronization signal and the Q output thereof connected to said microprocessor means.

4. The image screen automatic adjustment apparatus of claim 1, wherein said image inspection circuitry comprises:

an image inspector means for receiving R, G and B signals and for outputting said horizontal and vertical image signals;

a horizontal image processing circuitry coupled between said image inspector means and said microprocessor means for connecting the discontinuous sections of the horizontal image signal and for allowing said microprocessor means to measure the time period J of said horizontal image signal;

a vertical image processing circuitry coupled between said image inspector means and said microprocessor means for connecting the discontinuous sections of the vertical image signals and for allowing said microprocessor means to measure the time period Y of said vertical image signal; wherein said microprocessor means receives a vertical synchronization signal for determining the time periods Z and X of vertical front-back porch signals respectively based on the timing of said vertical image signal; and A horizontal front-back porch signal time period measuring circuitry coupled to said microprocessor means for receiving a horizontal synchronization signal and said horizontal image signal output by said horizontal image processing circuitry for measuring the time period I of said horizontal front-back porch signal that is provided to said microprocessor means for processing to obtain the horizontal image parameters.

5. The image screen automatic adjustment apparatus of claim 4 further comprising a switch means for enabling said automatic adjustment of said apparatus, wherein when said switch means is switched to enable said automatic adjustment, said apparatus implementing said processing for obtaining control parameters for said image screen in two schemes, wherein said first scheme being based on a set of four equations:

$$V_{size}=Y+[K_1(lX+Z)/2]$$

$$V_{position}=V_{pos}+[K_2(X-Z)]$$

$$H_{size}=J+K_3I$$

$$H_{position}=H_{pos}+K_4I$$

wherein $V_{pos}$ and $H_{pos}$ are predetermined values and $K_1$, $K_2$, $K_3$ and $K_4$ are predetermined constants; and wherein the second of said two schemes employs predetermined values to replace the vertical size parameter $V_{size}$ and vertical position parameter $V_{position}$ calculated in said first scheme, the horizontal size parameter $H_{size}$ equals the horizontal size parameter obtained in said first scheme added by a predetermined constant, and the horizontal position parameter $H_{position}$ equals the horizontal position parameter obtained in said first scheme.

6. The image screen automatic adjustment apparatus of claim 5, wherein said switch means is a software switch.

* * * * *